(12) United States Patent
Bell

(10) Patent No.: US 6,785,296 B1
(45) Date of Patent: Aug. 31, 2004

(54) SYSTEM AND METHOD FOR PROVIDING BANDWIDTH MANAGEMENT WITHIN A SMALL OFFICE, HOME OFFICE NETWORK

(75) Inventor: Russell W. Bell, Freehold, NJ (US)

(73) Assignee: Globespanvirata, INC, Red Bank, NJ (US)

( * ) Notice: Subject to any disclaimer, the term of this patent is extended or adjusted under 35 U.S.C. 154(b) by 0 days.

(21) Appl. No.: 09/578,763

(22) Filed: May 25, 2000

Related U.S. Application Data

(60) Provisional application No. 60/135,986, filed on May 25, 1999.

(51) Int. Cl.[7] .............................. H04J 3/16; H04L 12/66
(52) U.S. Cl. ....................... 370/468; 370/352; 370/401
(58) Field of Search ................................ 370/351–356, 370/400–402, 292, 465, 466, 468, 493–495, 431, 293; 379/90.01, 88.12; 375/219–222; 709/208–209

(56) References Cited

U.S. PATENT DOCUMENTS

| | | | |
|---|---|---|---|
| 5,982,784 A | * 11/1999 | Bell | 370/494 |
| 6,069,899 A | * 5/2000 | Foley | 370/494 |
| 6,229,818 B1 | * 5/2001 | Bell | 370/466 |
| 6,252,901 B1 | * 6/2001 | Mueller et al. | 375/222 |
| 6,345,071 B1 | * 2/2002 | Hamdi | 375/222 |
| 6,414,952 B2 | * 7/2002 | Foley | 370/352 |
| 6,434,123 B1 | * 8/2002 | Park | 370/293 |
| 6,456,714 B2 | * 9/2002 | Shima et al. | 370/431 |
| 2001/0012319 A1 | * 8/2001 | Foley | 375/222 |
| 2002/0198952 A1 | * 12/2002 | Bell | 709/208 |
| 2003/0016794 A1 | * 1/2003 | Brothers | 379/90.01 |

* cited by examiner

*Primary Examiner*—Steven Nguyen
(74) *Attorney, Agent, or Firm*—Thomas, Kayden, Horstemeyer & Risley

(57) ABSTRACT

A system and method for modifying the spectrum allocation for DSL and LAN signals in accordance with bandwidth requirements of a small office, home office (SOHO) network is disclosed. After initiation of computers within the SOHO network, a handshake procedure is performed between the SOHO network and a wide area network (WAN). The handshake procedure discloses bandwidth requirements for the SOHO network to perform local communication between local area networks (LANs), and for the SOHO network to communicate with the WAN. As a result, the system modifies the spectrum allocation for digital subscriber line (DSL) and LAN signals associated with the SOHO network such that maximum bandwidth allocation is provided in accordance with actual bandwidth need.

25 Claims, 4 Drawing Sheets

SYSTEM AND METHOD FOR PROVIDING BANDWIDTH MANAGEMENT WITHIN A SMALL OFFICE, HOME OFFICE NETWORK

CLAIM OF PRIORITY

This application claims priority to and the benefit of the filing date of U.S. Provisional Application Ser. No. 60/135,986 filed on May 25, 1999, and entitled, "The Use of G.HS as a Bandwidth Management Technique in SOHO Networks," which is incorporated by reference herein in its entirety.

FIELD OF THE INVENTION

The present invention generally relates to computer networking and, more particularly, is related to a system and method for providing efficient management of bandwidth between a small office, home office network and a wide area network.

BACKGROUND OF THE INVENTION

With the advancement of technology, computer prices have decreased substantially. Such decreases in computer prices have enabled individual homeowners to possess two or more computers within their place of residence or home office. Therefore, communications and computer vendors focus on various forms of network solutions that allow multiple computers to interconnect, share files, share peripherals such as printers and scanners, and generally interoperate as a small network. Due to an increase in the number of computers within a household, the concept of computer networking within a home, otherwise known as small office, home office (SOHO) networking has emerged as a new networking medium, outside of basic computer networking, which sets forth new complications and considerations to be addressed by equipment manufacturers and vendors.

Regardless of the technique used to provide local communication within a SOHO network environment, which may consist of the installed local telephone wiring only, care must be taken when injecting energy onto the existing wiring inside of a typical SOHO network. Specifically, the energy level used by the SOHO network should be large enough to allow reliable communications between local nodes without interfering with other devices such as telephones or other data services. Similarly, the spectrum of SOHO network signals should be selected to avoid interference with other services and technologies.

With the introduction of asymmetric digital subscriber line (ADSL) technology new methods of addressing bandwidth limitations within a broadband network have been introduced. Typically, within a bandwidth spectrum, a voice band, a data band, and a local communication band are allocated and fixed prior to initiation of the SOHO network. As known in the art, the voice band relates to the transmission of voice conversations by plain old telephone services (POTS); the data band relates to the transmission of data either, from the SOHO network to a central office (upstream) located within a wide area network (WAN), or from the central office to the SOHO network (downstream); and the local communication band relates to the transmission of data within the SOHO network.

Digital subscriber line (DSL) technologies, such as ADSL, were designed to operate with splitters where the splitters keep high frequency DSL information out of POTS circuits. There are a number of reasons why it is necessary to keep high frequency DSL information out of POTS circuits, such as, but not limited to, the impact that certain non-linear devices contained within the POTS devices can have on DSL signals. Specifically, it is possible that these signals can be "demodulated or downconverted" to signals that reside in the voice band thus resulting in decreased POTS performance (noise). G.LITE, a slower version of full rate DSL, was designed to operate without splitters. Further, a compromise splitter known as a micro data filter (MDF), may be used. The MDF is connected in series with POTS devices and is essentially, a "distributed splitter," wherein it allows offending devices to be "electrically removed" from the network.

Unfortunately, while a vast amount of fixed bandwidth is allocated for data transfer within the data band, and a small fixed bandwidth is allocated for local communication within the bandwidth spectrum, use of the data band and local band fluctuates in accordance with bandwidth needs associated with the SOHO network. Therefore, when data communication from the SOHO network to the WAN is minimal, resulting in minimal use of the fixed bandwidth spectrum allocated for such communication, the fixed bandwidth allocated for the data band is essentially wasted.

An example of a situation in which communication from the SOHO network to the WAN may be minimal includes, but is not limited to, evening hours when computers within a SOHO network may be automatically backing up files over a local area network (LAN), thus requiring additional local band bandwidth and no data band bandwidth. Alternatively, during normal working hours, employees may require additional data band bandwidth for various Internet activities.

Further, since there are bandwidth limitations within both the data band and the local band, increases in local communication traffic slow communication between other local nodes as the fixed bandwidth in the local network becomes totally utilized. In a network with a fixed allocation of bandwidth, the saturation of the Local network will happen regardless of the utilization of the data band spectrum. Therefore, it is desirable to allow networks to dynamically allocate bandwidth as necessary by using a mechanism such as G.HS.

SUMMARY OF THE INVENTION

In light of the foregoing, the present invention provides a system and method for providing bandwidth management within a SOHO network for the efficient transmission of information associated with the SOHO network.

Generally, the system modifies the spectrum allocation for ADSL and LAN signals in accordance with bandwidth requirements of the SOHO network for communication within the SOHO network and with a WAN. After initiation of modems within the SOHO network, a handshake procedure, such as G.HS, is performed between the SOHO network and a central office (CO) located within the WAN. During the handshake procedure the SOHO network discloses bandwidth requirements for the SOHO network to perform local communication between LANs. The CO then informs the SOHO network as to whether LANs within the SOHO network can increase the bandwidth used for local communication. The SOHO network may also be informed to decrease bandwidth used for local communication so that bandwidth used for communication between the SOHO network and the WAN may be increased. The combination of these two scenarios assures that maximum bandwidth allocation is provided in accordance with bandwidth need.

The invention has numerous advantages, a few of which are delineated hereafter as examples. Note that the embodiments of the invention, which are described herein, possess one or more, but not necessarily all, of the advantages set out hereafter. One advantage of the invention is that the bandwidth management system provides an efficient means of maximizing SOHO network performance.

Another advantage is that the invention can relocate transmissions in the LAN to minimize interference with other services, thereby providing flexibility for future unanticipated devices, and allowing a proprietary network to operate without regard to the same spectral allocation rules required in a PSTN.

Other features and advantages of the present invention will become apparent to one of reasonable skill in the art upon examination of the following drawings and detailed description. It is intended that all such additional features and advantages be included herein within the scope of the present invention as described by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The bandwidth management system of the present invention can be implemented in software, firmware, hardware, or a combination thereof. In the preferred embodiment of the invention, which is intended to be a non-limiting example, the system is implemented in software that is executed by a computer, for example, but not limited to, a personal computer, work station, mini computer, or mainframe computer.

The software-based system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
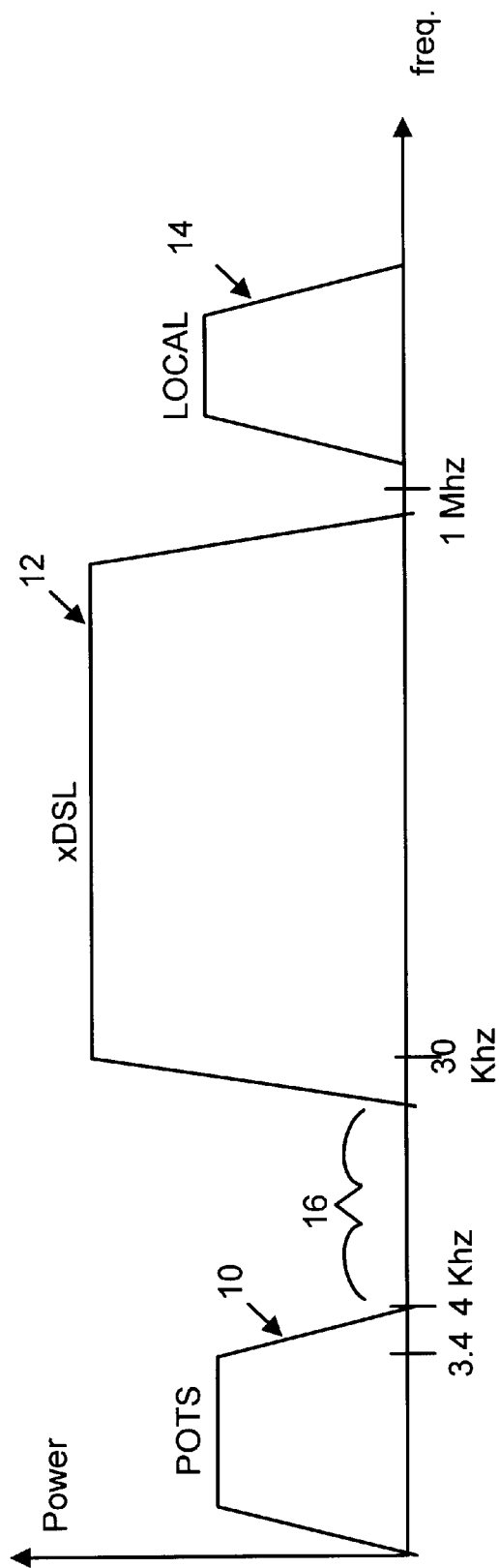
FIG. 1 is a graph illustrating spectrum allocation for POTS, ADSL, and local area network signals.

Referring now to the drawings, wherein like reference numerals designate corresponding parts throughout the drawings, FIG. 1 shows a spectrum allocation for plain old telephone service (POTS), asymmetric digital subscriber line (ADSL), and local area network (LAN) signals. Specifically, the graph is a plot of frequency on the horizontal axis and power on the vertical axis. As is known, the POTS frequency band 10 generally extends from approximately DC, or 0 hertz, to approximately 3.4 kilohertz. The ADSL frequency band 12 generally extends from approximately 30 kilohertz up to an upper boundary of approximately 1 megahertz. The LAN frequency band 14 generally extends past 1 megahertz since local communication within a LAN can use bands outside of the traditional ADSL bands.

A separation or guard band 16 provides a margin of signal separation between the POTS frequency band and the ADSL frequency band, thereby allowing both POTS and ADSL to co-exist on the same wire. The ADSL frequency band may also be divided into an upstream and downstream channel, wherein the upstream channel is used to transmit data from a local network, such as a local area network (LAN), to a network such as a wide area network (WAN); and the downstream channel is used to transmit data from a WAN to a LAN. It should be noted, that while the present disclosure describes use of the ADSL frequency band, one skilled in the art will appreciate that the present disclosure need not be limited to ADSL, but instead, may apply to any particular digital subscriber line technology and any other fixed bandwidth systems capable of re-allocating bandwidth on as as-needed basis.

Figure 2:
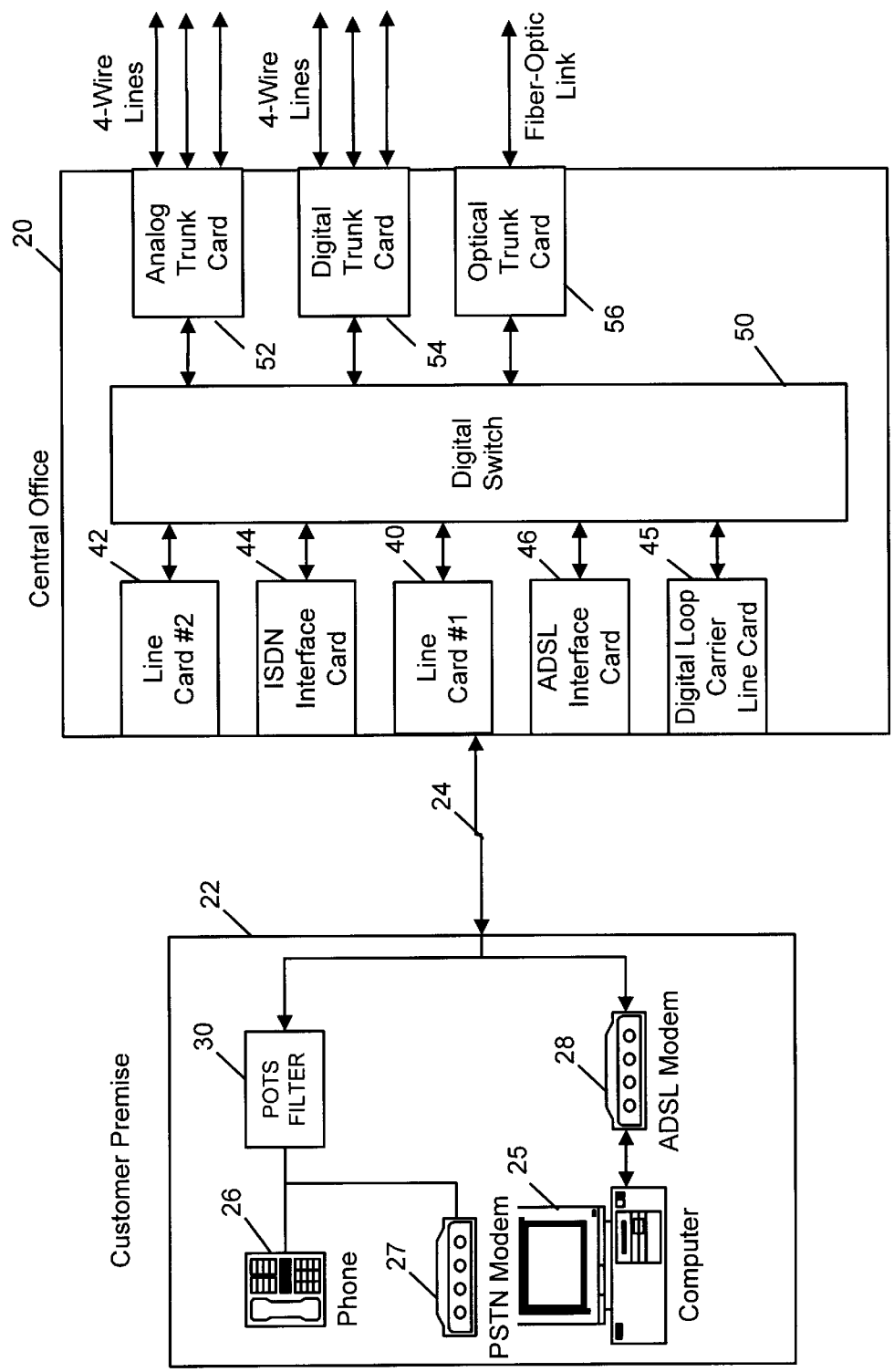
FIG. 2 is a block diagram of a communications system between a central office and a customer premise that may be used in the implementation of the system of the preferred embodiment of the invention.

Referring now to FIG. 2, a communication system is shown which may be used in the implementation of the system of the preferred embodiment of the invention. Specifically, FIG. 2 illustrates communication between a central office 20 and a customer premise 22 by way of a local loop 24. While the customer premise 22 may be a single dwelling residence, a small business, or other entity, it is generally characterized as having a computer 25 and POTS equipment, such as a telephone 26, PSTN modem 27, fax machine (not shown), etc. Particular to the preferred embodiment of the invention, the customer premise 22 is a SOHO network comprising a number of computers that are logically connected, and the central office 20 is located within a WAN. The customer premise 22 may also include an ADSL communication device, such as an ADSL modem 28.

As known in the art, when an ADSL service is provided, a POTS filter 30 is interposed between the POTS equipment 26 and the local loop 24. As is known, the POTS filter 30 includes a low pass filter having a cut-off frequency of approximately 4 kHz to 10 kHz, in order to filter high frequency transmissions from the ADSL communication device 28 and protect the POTS equipment 26.

At the central office 20, additional circuitry is provided. Generally, a line card 40 containing line interface circuitry is provided for electrical connection to the local loop 24. In fact, multiple line cards may be provided 40, 42 to serve as a plurality of local loops 24. In the same way, additional circuit cards are typically provided at the central office 20 to handle different types of services. For example, an integrated services digital network (ISDN) interface card 44, a digital loop carrier line card 46, and other circuit cards, for supporting similar and other communication services, may be provided. Particular to the present bandwidth management system, an ADSL interface card 45 may also be provided at the central office 20 in order to handle ADSL services, as used by the preferred embodiment of the invention.

A digital switch 50 is also provided at the central office 20 and is disposed for communication with each of the various line cards 40, 42, 44, 45, 46. On the outgoing side of the central office 20 (i.e., the side opposite the various local loops), a plurality of trunk cards 52, 54, 56 are typically provided. For example, an analog trunk card 52, a digital trunk card 54, and an optical trunk card 56 are all illustrated in FIG. 2. Typically these cards are outgoing lines that support numerous multiplexed transmissions and are typically destined for other central offices or long distance toll offices.

Figure 3:
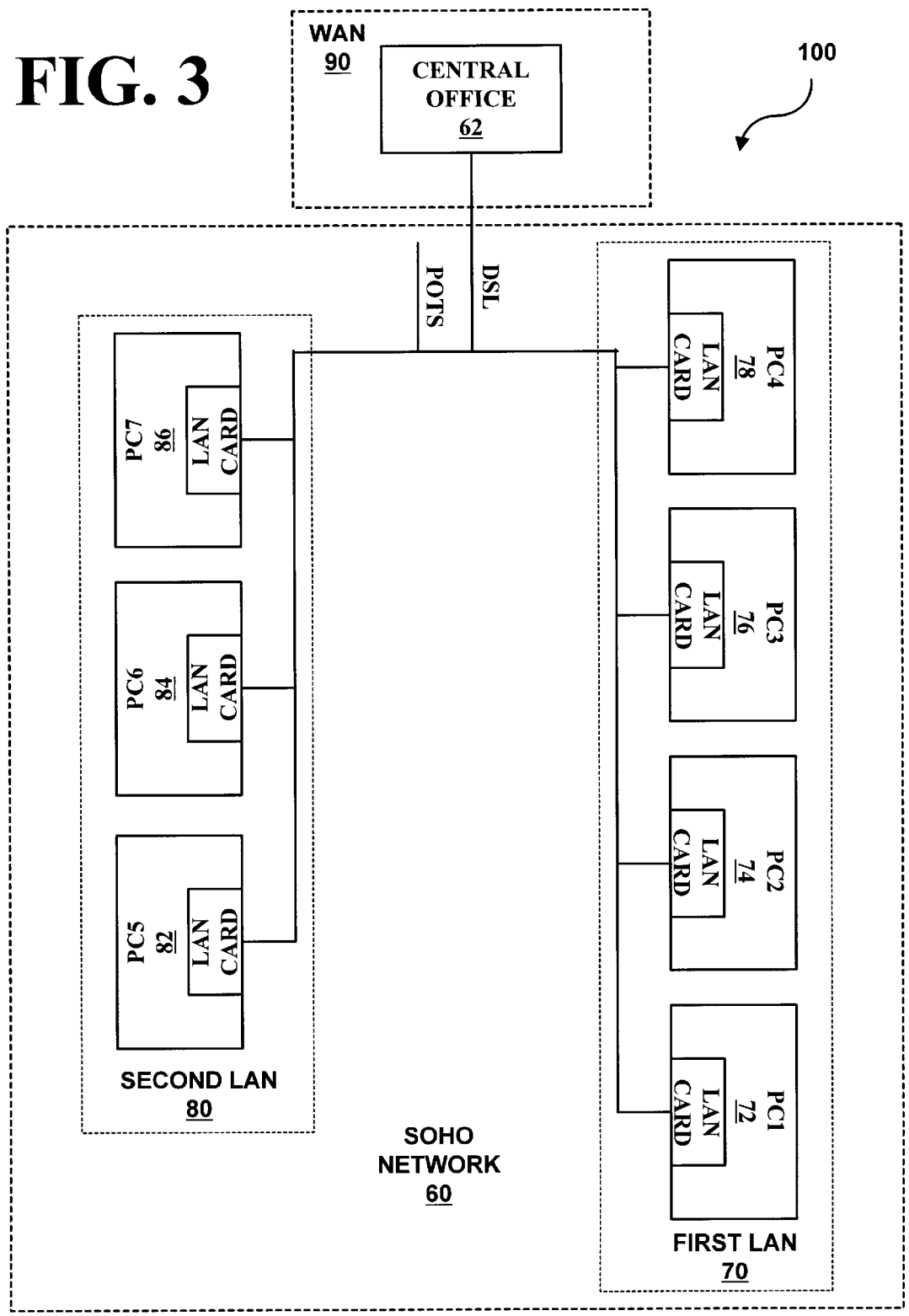
FIG. 3 is a block diagram illustrating the bandwidth management system wherein the customer premise is a soft office, home office network, in accordance with the preferred embodiment of the invention.

FIG. 3 is a block diagram of the bandwidth management system 100 wherein the customer premise 22 of FIG. 2 is a soft office, home office (SOHO) network, in accordance with the preferred embodiment of the invention. As shown, a SOHO network 60 is used as the customer premise 22 in FIG. 2. The SOHO network 60 comprises a first LAN 70 and a second LAN 80, either, or both of which are connected to a DSL and at least one POTS line. Connection between the SOHO network 60 and the central office 20 may be provided by a first xDSL modem (not shown) located at the SOHO network 60 and a second xDSL modem (not shown) located at the central office 20. As known in the art, the central office 20 of FIG. 2 is located within the WAN 90, wherein the WAN 90 may provide for numerous types of services. Such services may include, but are not limited to, ADSL services, high bit rate digital subscriber line (HDSL) services, symmetric digital subscriber line (SDSL) services, multirate digital subscriber line (MSDSL) services, and/or rate adaptive digital subscriber line (RADSL) services.

It should be noted that while the present disclosure describes use of two separate LANs 70, 80 within the SOHO network 60, one skilled in the art will appreciate that the number of LANs need not be limited to two, but may instead be more than two. In fact, the number of LANs within the SOHO network 60 may even be limited to a single LAN comprising a series of computers. Further, the number of POTS lines and DSLs may also differ from the number illustrated herein.

As shown by FIG. 3, the first LAN 70 comprises a series of computers therein, illustrated as PC1 72, PC2 74, PC3 76, and PC4 78, and the second LAN 80 comprises a series of computers therein, illustrated as PC5 82, PC6 84, and PC7 86. To provide LANs, each computer within the first and second LANs 70, 80 contains a NIC that connects to a PCI slot located within the computer, thereby providing networking capabilities within each respective network. Preferably, a LAN card is inserted into the PCI slot of each computer to provide networking capabilities such that computers PC1 72, PC2 74, PC3 76, and PC4 78 are logically connected as the first LAN 70, and computers PC5 82, PC6 84, and PC7 86 are logically connected as the second LAN 80.

In order to extend the SOHO network 60 to the WAN 90 to permit communications between the SOHO network 60 and the WAN 90, the SOHO network 60 may be configured with identical hardware and software installed on each of the computers within the SOHO network 60. A master computer or master node may be selected using one or more LAN initialization algorithms. The master computer provides for communication between the first LAN 70 and the second LAN 80, and between the SOHO network 60 and the WAN 90. Preferably, the master computer acts as the only node that connects to the central office 20 and negotiates bandwidth, as described in detail hereinbelow.

An example of a possible way in which a master computer or node may be selected, is described in U.S. Pat. No. 6,011,781, entitled "Multipoint access protocol utilizing a point-to-point methodology," by Russell Bell, filed Mar. 19, 1997, the disclosure of which is incorporated herein by reference.

Should a particular computer or node fail either as the result of hardware or software problems, the LANs 70, 80 within the SOHO network 60 may be re-configured with a new master computer selected to assume control of the gateway function between the SOHO network 60 and the WAN 90. It will be appreciated by those skilled in the art that a number of topologies and architectures for LANs exist. A system and method to interface the SOHO network 60 to the WAN 90 in accordance with the present invention may be implemented with any of a number of LAN configurations.

Alternatively, in order for the first and second LANs 70, 80 to be connected to allow communication amongst computers within the first LAN 70 and the second LAN 80, a small hub, such as, for example, a 10/100 base T hub, is installed, along with the installation of special cables from each computer within the SOHO network 60 to the hub. All computers then have a NIC, such as, for example, a 10/100 base T NIC, installed. Finally, each computer within each LAN 70, 80 has software added/configured to allow all computers to begin operation in a local area network environment.

Figure 4:
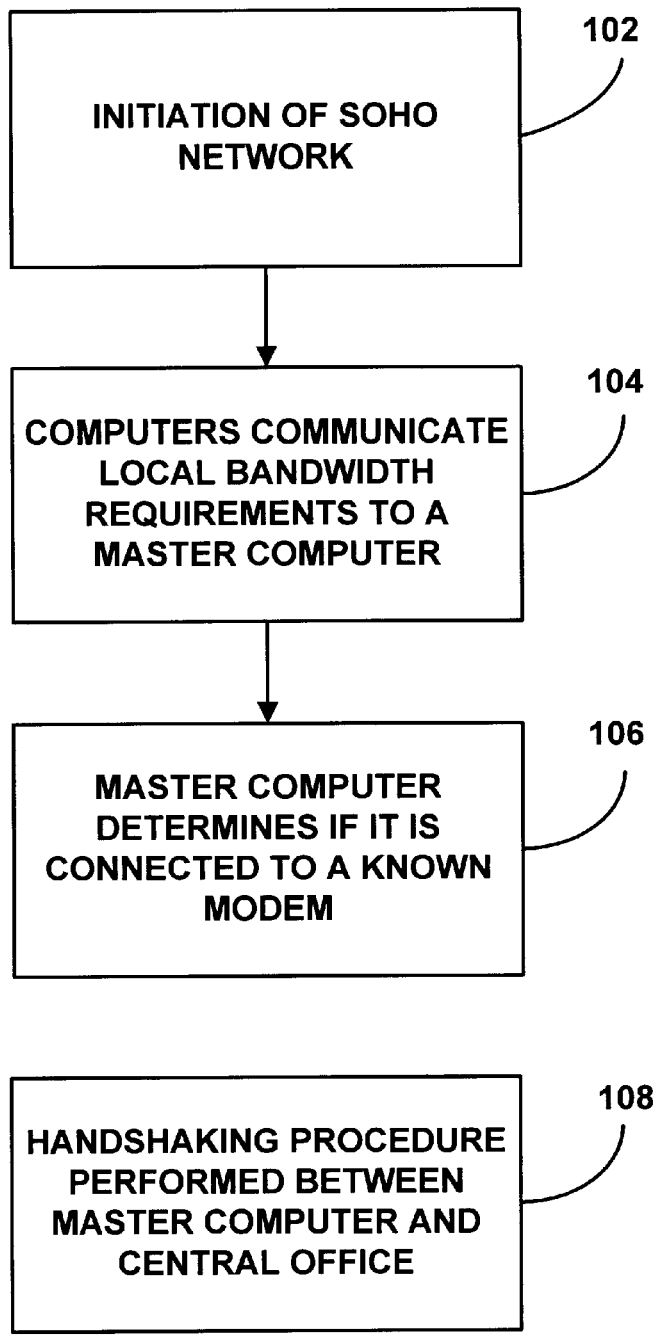
FIG. 4 is a flow chart illustrating logic performed by the bandwidth management system of FIG. 3.

FIG. 4 is a flow chart illustrating logic performed by the bandwidth management system 100 in accordance with the preferred embodiment of the invention. As shown by block 102, the SOHO network 60 is first initiated such that computers within the network 60 are turned on.

As shown by block 104, computers within the first and second LANs 70, 80 then communicate local bandwidth requirements to a master computer located within the SOHO network 60. The master computer located within the SOHO network 60 then communicates with the central office 20 via an ADSL modem and a DSL in order to determine whether a known modem is connected to the master computer (block 106) at the central office 20. As mentioned hereinabove, communication may alternatively be provided directly between computers within the first and second LANs 70, 80 and the central office 20 via an ADSL modem 28 (FIG. 2) and a DSL in order to determine whether a known modem is connected to the computers. If the modem at the central office 20 that is connected to the SOHO network 60 master computer is known, a handshaking procedure is performed in which bandwidth requirements for communication within the SOHO network 60, and between the SOHO network 60 and the WAN 90, are negotiated (block 108), as described in detail hereinbelow.

Different handshaking techniques may be used. As an example, and in accordance with the preferred embodiment of the invention, during the course of development of ADSL standards by the International Telecommunication Union (ITU) and the American National Standards Institute (ANSI), considerable discussion focused upon a form of handshaking that could be used between the customer premise 22 (FIG. 2), or SOHO network 60 (FIG. 3), and the central office 20. As a result, the ITU developed and integrated a protocol named G.HS in which a process for "non-standard facilities" is included within the protocol. This process allows systems vendors to add value to their solutions by embedding specialized functions into their products, such as modems, that are a superset of the defined ITU/ANSI standards. Therefore, additional services, above and beyond those defined by the standards may be defined and implemented by use of the G.HS protocol.

Further describing use of the G.HS protocol by the preferred embodiment of the invention, if during the G.HS procedure the ADSL at the customer premise 22 recognizes a modem at the central office 20, the G.HS protocol instructs the ADSL modem to invoke the non-standard facilities. Specific to the preferred embodiment of the invention, the G.HS protocol is used to provide signaling between a master computer within the SOHO network 60 and the central office 20.

During the G.HS "non-standard facilities" exchange (block 108), the SOHO network 60 discloses bandwidth requirements for the SOHO network 60 to perform local communication between the LANs 70, 80, to the central office 20. The central office 20 then informs the SOHO network 60 as to whether the LANs 70, 80 within the SOHO network 60 can increase the bandwidth used for local communication, by using bandwidth allocated for data communication between the SOHO network 60 and the WAN 90 (the data band). The SOHO network 60 may also be informed by the central office 20 to decrease bandwidth used for local communication so that bandwidth used for communication between the SOHO network 60 and the WAN 90 may be increased by using bandwidth allocated for local communication within the SOHO network 60 (the local band). The above-mentioned assures that maximum bandwidth allocation is provided in accordance with bandwidth need. This process provides a convenient, dynamic, adjustable, and flexible way to use the total available bandwidth between communicating entities.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for modifying bandwidth allocation in accordance with bandwidth requirements of a small office, home office (SOHO) network, having a series of computers therein, comprising:

a first transceiver, located within said SOHO; and a second transceiver, located within a wide area network (WAN), wherein said first transceiver and said second transceiver are capable of specifying a required spectrum allocation for communication within said SOHO network, and between said SOHO network and said WAN, such that said system appropriately allocates bandwidth according to said specification, wherein said second transceiver communicates with said first transceiver to determine whether to increase bandwidth use within said SOHO network by decreasing bandwidth use between said SOHO network and said WAN, and wherein said second transceiver communicates with said first transceiver to determine whether to increase bandwidth use between said SOHO network and said WAN by decreasing bandwidth use within said SOHO network.

2. The system of claim 1, wherein said computers within said SOHO network are divided into at least two local area networks (LANs).

3. The system of claim 1, wherein said specifying a required spectrum allocation is performed during a handshake procedure between said first transceiver and said second transceiver after initiation of said computers within said SOHO network.

4. The system of claim 3, wherein said handshake procedure is performed via use of a G.HS protocol.

5. The system of claim 3, wherein said handshake procedure is made via a digital subscriber line.

6. The system of claim 1, wherein said spectrum allocation is divided into a voice band, a data band, and a local band, wherein said voice band is the spectral allocation for plain old telephone service signals, said data band is the spectral allocation for asymmetric digital subscriber line signals, and said local band is the spectral allocation for local area network signals.

7. The system of claim 6, wherein said data band allocation has a lower boundary of approximately 30 kilohertz and an upper boundary of approximately 1 megahertz, and said local band allocation extends past 1 megahertz.

8. The system of claim 1, wherein said system can dynamically update said spectrum allocation in accordance with new communication requirements which effect bandwidth requirements for the transmission of data between said SOHO network and said WAN, and within said SOHO network.

9. The system of claim 1, wherein said system is an asymmetric digital subscriber line (ADSL) system.

10. A method of modifying bandwidth allocation in accordance with bandwidth requirements of a small office, home office (SOHO) network having a series of computers therein, comprising the steps of:

initiating said series of computers within said SOHO network;

said series of computers communicating with a central office located within a wide area network (WAN); and performing a handshaking procedure to determine a bandwidth spectrum allocation for communication within said SOHO network, and between said SOHO network and said WAN, wherein the handshaking procedure comprises determining whether to increase bandwidth use within said SOHO network by decreasing bandwidth use between said SOHO network and said WAN, and determining whether to increase bandwidth use between said SOHO network and said WAN by decreasing bandwidth use within said SOHO network.

11. The method of claim 10, wherein said communication between said series of computers and said central office is performed via an asymmetric digital subscriber line modem.

12. The method of claim 10, wherein said step of performing a handshaking procedure is performed via use of a G.HS protocol.

13. The method of claim 10, wherein said series of computers within said SOHO network is divided into at least two local area networks (LANs).

14. The method of claim 10, wherein said handshake procedure is made via a digital subscriber line.

15. The method of claim 10, wherein said bandwidth spectrum allocation is divided into a voice band, a data band, and a local band, wherein said voice band is the spectral allocation for plain old telephone service signals, said data band is the spectral allocation for asymmetric digital subscriber line signals, and said local band is the spectral allocation for local area network signals.

16. The method of claim 15, wherein said data band allocation, prior to performing said handshaking procedure, has a lower boundary of approximately 30 kilohertz and an upper boundary of approximately 1 megahertz, and said local band allocation extends past 1 megahertz.

17. The method of claim 10, further comprising the step of dynamically updating said bandwidth spectrum allocation in accordance with new communication requirements which effect bandwidth requirements for the transmission of data between said SOHO network and said WAN, and within said SOHO network.

18. A system for modifying bandwidth allocation in accordance with bandwidth requirements of a small office, home office (SOHO) network, having a series of computers therein, comprising:

a means for initiating said series of computers within said SOHO network;

a means for providing communication between said series of computers and a central office located within a wide area network (WAN); and a means for performing a handshake procedure to determine a bandwidth spectrum allocation for communication within said SOHO network, and between said SOHO network and said WAN, wherein the means for performing a handshaking procedure comprises determining whether to increase bandwidth use within said SOHO network by decreasing bandwidth use between said SOHO network and said WAN, and determining whether to increase bandwidth use between said SOHO network and said WAN by decreasing bandwidth use within said SOHO network.

19. The system of claim 18, wherein said means for providing communication between said series of computers and said central office is an asymmetric digital subscriber line modem.

20. The system of claim 18, said means for performing a handshake procedure is a G.HS protocol.

21. The system of claim 18, wherein said series of computers within said SOHO network is divided into at least two local area networks (LANs).

22. The system of claim 18, wherein said handshake procedure is made via a digital subscriber line.

23. The system of claim 18, wherein said bandwidth spectrum allocation is divided into a voice band, a data band, and a local band, wherein said voice band is the spectral allocation for plain old telephone service signals, said data band is the spectral allocation for asymmetric digital subscriber line signals, and said local band is the spectral allocation for local area network signals.

24. The system of claim 23, wherein said data band allocation, prior to performance of said handshake procedure, has a lower boundary of approximately 30 kilohertz and an upper boundary of approximately 1 megahertz, and said local band allocation extends past 1 megahertz.

25. The system of claim 18, further comprising a means of dynamically updating said bandwidth spectrum allocation in accordance with new communication requirements which effect bandwidth requirements for the transmission of data between said SOHO network and said WAN, and within said SOHO network.

* * * * *